Figure 2:
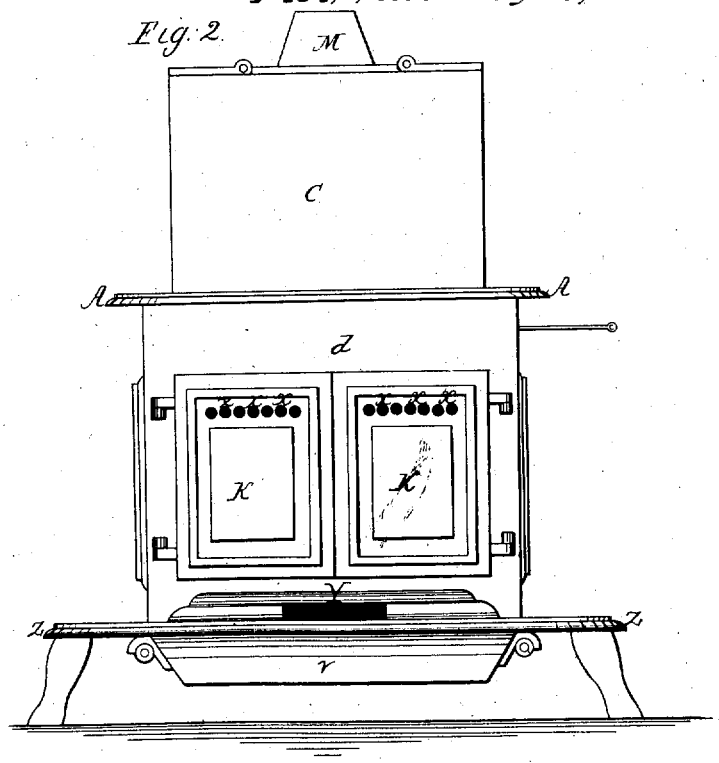

P. P. Stewart. Sheet 1-3 Sheets.

Cook Stove.

No. 3,452. Reissued May 18, 1869.

Witnesses;
A. Edstrom
Saml. J. Mann

Eliza C. Stewart.
Legatee and Executrix
by Prindle and Dyer
Attys

P. P. Stewart. Sheet 2-3, Sheets.

Cook Stove.

No. 3,452. Reissued May 18, 1869.

Witnesses;
A. D. Schenck
Saml. J. Marr

Elvira C. Stewart Legatee & Executrix
by Prindle & Dyer, Attorneys.

Sheet 3-3 Sheets.

P. P. Stewart.

Cook Stove.

No. 3,452. Reissued May 18, 1869.

Witnesses;
[illegible]
Saml. J. Mann

Eliza C. Stewart Legatee & Executrix
by Prindle & Lyon Attorneys.

UNITED STATES PATENT OFFICE.

ELIZA C. STEWART, OF TROY, NEW YORK, SOLE LEGATEE AND EXECUTRIX OF THE ESTATE OF PHILO P. STEWART, DECEASED.

IMPROVEMENT IN COOKING-STOVES.

Specification forming part of Letters Patent No. 22,681, dated January 18, 1859; Reissue No. 3,027, dated May 31, 1864; Reissue No. 3,452, dated July 7, 1868.

*To all whom it may concern:*

Be it known that PHILO P. STEWART, deceased, late of the city of Troy, county of Rensselaer, and State of New York, did on the 18th day of January, A. D. 1859, obtain of and from the United States of America certain Letters Patent for and upon new and useful Improvements in Cooking-Stoves, which said Letters Patent were duly surrendered and thereafter duly reissued, as provided by law, bearing date the 31st of May, 1864, and were again surrendered and reissued in two divisions, numbered 1 and 2, and bearing date of July 7 and 14, 1868, respectively, and which said reissued Letters Patent have been found to be defective in that certain mistakes were made in the specifications and certain ambiguities exist in the claims thereof, by reason of which said specifications and claims do not cover and embrace all of the original invention and improvements contained in the drawings and models first and originally filed in the United States Patent Office—to wit, on the 17th day of August, 1855, which application, after being once rejected, was withdrawn and a new application upon the same invention and improvements was duly filed, as by law made and provided—to wit, on the 20th day of October, 1858, each of which were in due form of law, but neither of which contained in the specifications and claims thereof the entire invention and improvements contained in the drawings originally made and filed in said Patent Office, as aforesaid. Now, therefore, ELIZA C. STEWART, sole legatee and sole executrix of the estate of the aforesaid PHILO P. STEWART, deceased, being desirous to reissue the Letters Patent herewith surrendered (Division 1) in the manner and form as stated in the accompanying petition, has prepared specifications and drawings of the said original invention and improvements, and does hereby declare that the following specification is a full, clear, exact, and more full description of that part of the said invention and improvements mentioned and contained in the claims hereto annexed, as well as of the construction, arrangement, and operation of same, reference being had to the accompanying drawings, in which—

Figure 1:
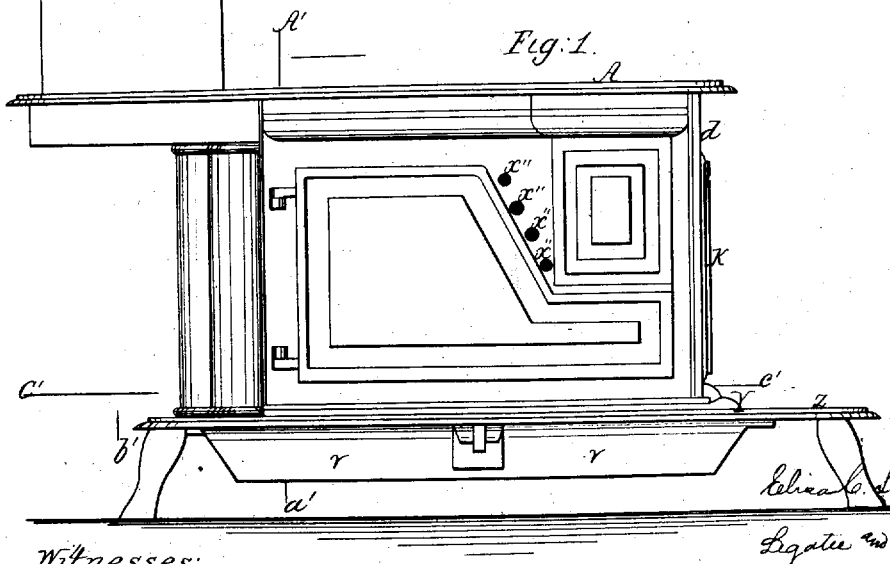
Figure 5:
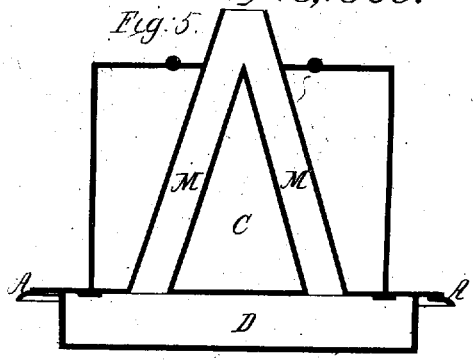
Figure 5:
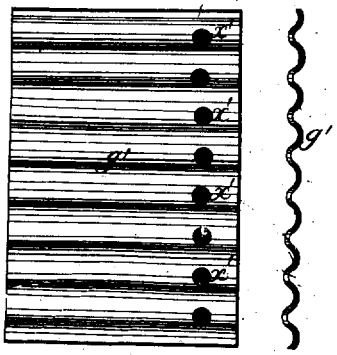
Figure 4:
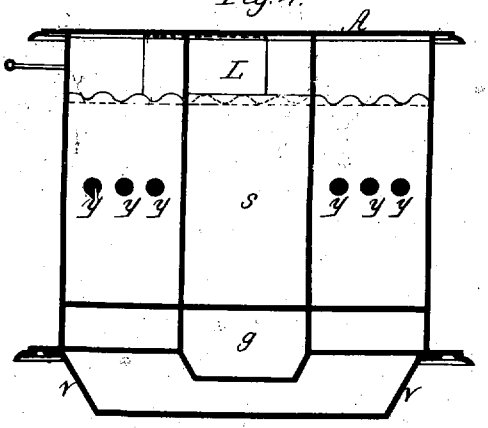
Figure 3:
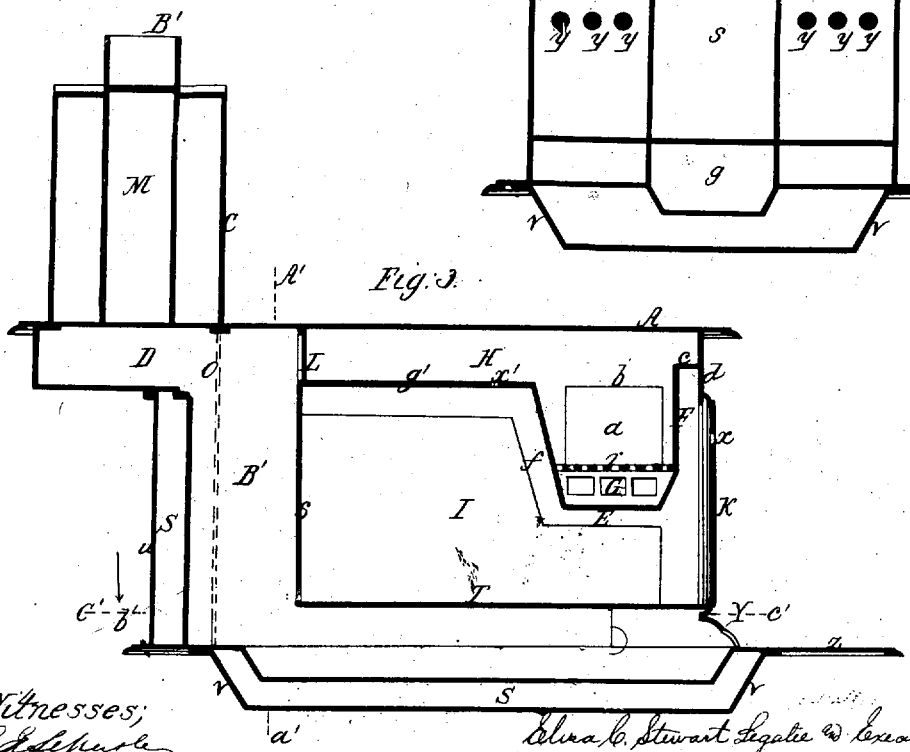
Figure 7:
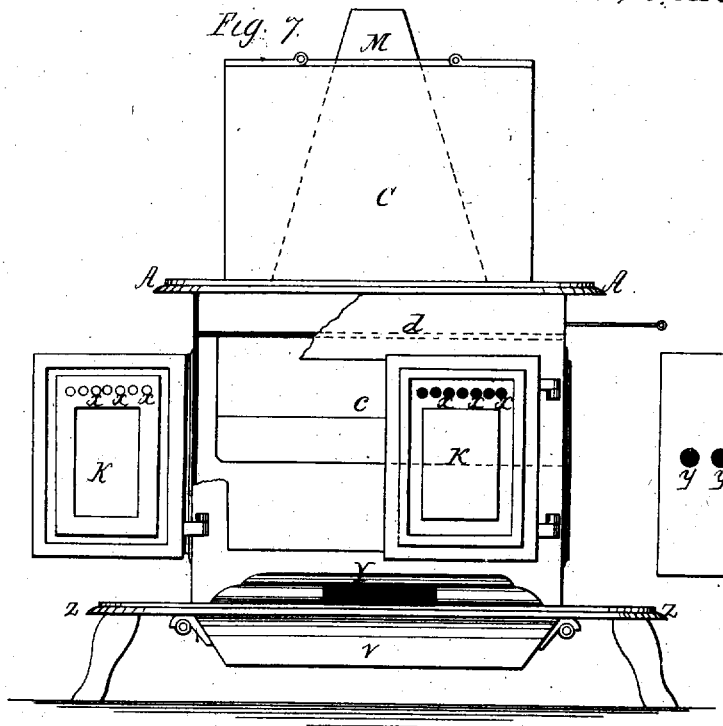
Figure 8:
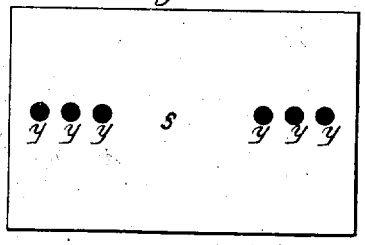
Figure 6:
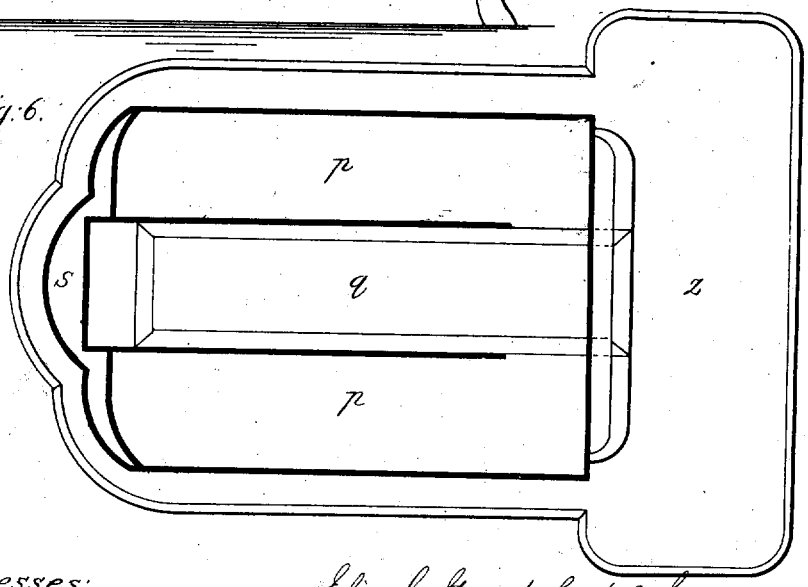

Figure 1 is a side elevation of a cooking-stove containing the invention and improvements herein and hereby set forth. Fig. 2 represents a front elevation, showing the front doors opening into the oven and containing the apertures therein, and each and all hereinafter more fully described and set forth. Fig. 3 is a longitudinal vertical section showing the different parts hereinafter described and set forth. Figs. 4, 5, and 6 are sections taken on and at the lines A′ *a* B′ *b*′ C′ *c* of Fig. 1 of the accompanying drawings. Fig. 7 is a broken front elevation showing the front of fire-box or chamber of combustion and the hot-air chamber or heating-flue between the front and end plates of such fire-chamber and the front plate or doors and the side plate of the stove in the manner substantially as hereinafter described and for the purpose set forth. Fig. 8 shows the plate in the rear or back of the oven and immediately between the oven and the vertical flue or flues in the immediate rear or back end of the cooking-stove, with openings or apertures therein of a sufficient number and size as may be required to accomplish the purposes hereinafter described and set forth.

Letters of like name and kind refer to like parts in each of the figures of the accompanying drawings, of which there are four sheets, numbered from 1 to 4, respectively.

The nature of the invention contained in this specification consists in admitting a current of atmospheric air through the front plate of a cooking-stove into the space between such front plate and the front plate of the fire-chamber, which air, becoming highly heated by contact with the front plate of said fire-chamber, is admitted to the oven of said cooking-stove to aid by its heat the baking of articles in said oven, and also to ventilate said oven, after which said air is allowed to pass off through openings in the back of the oven into the rear vertical flue or flues, or through openings in the top oven-plate, into the upper horizontal flue of said stove. A current of air is also admitted from the front or through the side of such stove to a similar space at the end of said fire-chamber and passed into said oven for the same purpose as aforesaid.

It also consists in providing the front of a stove with suitable doors, which open in front of the fire-box, (where the draft is governed without the aid of such doors,) of suitable size, so that a tin kitchen or other roaster may, when such doors are opened, be placed in front of said fire-chamber.

It also consists in the employment of suitable doors in the front of a cooking-stove, which shall open into that part of the oven which extends forward and under said fire-chamber and the ash-chamber, (necessarily used therewith,) that more easy access may be had to articles baking in that part of said oven, and that when a roaster is used in front of the stove the heat from said oven may aid in the process of roasting.

It also consists in the employment of covers or extra plates for the bottom and back or rear end of said cooking-stove, which, when placed at a proper distance from the bottom or back of said stove, prevent the heat from being radiated into the room in which the stove is used and reflect the heat back into the stove, and which also furnishes an air-space between such extra plates and the bottom and back, which acts as a non-conductor to prevent the heat from passing out of said stove, whereby the economy and comfort of the same is greatly increased.

It also consists in the employment of a fire-chamber together with the fire-grate and ash-chamber necessarily used therewith when the same is suspended in the front upper corner of said cooking-stove, so that the heat radiated from the front and end plates of said fire-chamber, or from either of them, may be employed in heating said oven.

It also consists in the employment of doors, which open in front of the fire-box, and also in front of that portion of the oven which extends under the fire-box of such stove, by means of which the heat from the oven and front of the fire-box may be used in roasting, or in cold weather may be thrown out into the room where the stove is used.

It also consists in the employment of a corrugated oven-top plate perforated along the front thereof, when such oven extends back of said fire-box.

It also consists in the employment of a damper in front of the oven and in the hearth of a cooking-stove, and in combination with the flues underneath the oven of such stove.

In the accompanying drawings, *a* represents the fire-chamber, located at the front and upper corner of the oven, extending nearly across from side to side of the stove, leaving a small space between one of its ends and the side plate of said stove. There is also a space between the front plate of the fire-chamber and the front plate or front doors of the stove, and each of these spaces so formed is provided with openings communicating with the oven, so that said spaces become parts of said oven, the air being allowed to circulate from one to the other. The fire-chamber, being thus suspended in the oven, and its sides and end aiding in the heating of said oven, largely adds to the economy of fuel. The front plate, *c*, of the fire-chamber may be of any form deemed best, either plain or corrugated, and arranged as near the front plate, *d*, or doors K of the stove as may be deemed necessary in order to give sufficient capacity to the space or chamber F, that the air therein may be heated and supplied to the oven. Within this fire-chamber is a fire-grate, *r*, which may be of any kind deemed best to use, either stationary, shaking, or dumping, and under this grate is an ash-chamber to receive the ashes from the fire. The ash-chamber and grate are required with the fire-chamber, as described, and are combined with it, and the whole suspended in the front upper corner of the oven. At one end of said fire chamber, and in the side of said stove, is formed a door, *b*, for supplying fuel to said fire-chamber, removing ashes, and cleaning the grate. In said door is constructed a damper, G, by which the fire is regulated and the needed air supplied to the fire to promote combustion. Said damper may be of any capacity desired in order to furnish the required amount of air to the fire. In order that a current of air heated within the space in front and at the end of said fire-chamber may be supplied to the oven of the stove, a number of openings, *x x*, &c., are provided in the doors K, which open in front of said fire-chamber, and other openings, *x''*, in the side plate of said stove, which communicate with said spaces in front and at the end of said fire-chamber. The air thus admitted becomes highly heated and passes down and into the oven, greatly increasing the economy of said stove to perform baking or roasting in the oven thereof. When the air has passed through the oven and aided in the heating thereof, it passes out at the holes *y* in the back oven-plate, *s*, in the oven-top plate *g'*, and thence into the flues of the stove, by which means a thorough ventilation of said oven is secured.

It will be readily seen that the apertures *x x*, &c., might be in the front plate, *d*, or in any other part of the stove, provided that a current of air passed into the chamber in front of the fire-chamber, and was there heated and then passed into the oven, and also that they may be of any required capacity; but they should be so regulated as regards size as that the air passing through them must be highly heated before entering the oven, while the openings *y* through the back of the oven or *x'* in the oven-top plate, must be of such size as to remove enough air from the oven to secure complete ventilation without lessening the heat of said oven.

The apertures *x x*, &c., may be at the upper part of the space F, or at the bottom of the same, in which latter event some means for conveying the air to the upper part of said space must be provided, such as, for example, a partition-plate extending from below said apertures to a point near the upper front of said space, by which means the air would be caused to pass up over said partition-plate and then down into the oven.

The plate E, below the bottom of the ash-chamber, under the grate, the inclined plate *f*, and the horizontal plate *g'* form the top of the oven, while the back oven-plate, *s*, and the oven-bottom T form the covering of the flues beneath and in rear of said oven. The oven thus extends under the fire and ash chambers to the front of the stove and connects with the space in front and at the end of said fire-chamber so as to receive the heated air therefrom. Along the front part of said plate *g'*, near the plate *f*, Fig. 3, are provided a number of apertures, *x*,' of sufficient size to permit of the escape into the flues of the amount of air required to ventilate the oven, and the jets of air entering said flue at that point meet and unite with the hot gases arising from the fire and insure the perfect combustion of said gases.

The doors K K open in front of the fuel-chamber and of that part of the oven situated beneath, and with the front plate of said fuel-chamber form the space F, so that when open a roaster, made of tin or other suitable material, may be placed upon the apron *z*, so as to fill the opening in the front of said stove and receive the heat radiated from the front plate of said fuel-chamber, and also from the several plates of the oven, for the purpose of cooking or roasting such articles as may be placed within said roaster.

If desired, the front doors need not be as long as are here represented, but may only extend from the top of the space F to the bottom of the ash chamber, and the opening into the oven may in this case be closed by extra doors, or by a stationary or removable plate, in which event there would still be heat enough thrown from the front of the fire chamber for roasting purposes or to heat a room tolerably well; or the doors may extend only so high as the bottom of the ash-chamber, and the space in front of the fire-chamber may be closed on the front by the front plate of the stove, or by a removable plate, and the apertures *x x*, &c., made in said front or removable plate. In this latter case the heat of the oven thrown into the roaster would roast tolerably well. It is better, however, to have the doors extend the whole length and leave the oven open, except when closed by such doors, as then the heat from both the fire-box and oven act with undiminished effect upon the articles in said roaster.

The oven of the stove is not only provided with doors in front, but, like other stoves, has doors on the sides. Each of these doors is lined with tin, which acts as a reflector and non-conductor for the heat of the oven, preventing it from being wasted by being thrown into the room. In cold weather said front and side doors may be thrown open to allow the heat from the front plate of the fire-chamber and from the oven to pass into and warm the room.

The flue H extends between the top of the stove and the top of the oven from the fire-chamber to the back flues, where it connects with three vertical flues, which extend down the back and discharge into others passing under to the front of the stove. At the junction of the flue H and the vertical flues is arranged a damper, L, which governs the passage to the center vertical or ascending flue. When said damper is open, the heated escaping products of combustion from the fire chamber will pass over the top of said center vertical flue, through the exit flue or pipe M, into the chimney; but if said damper be closed, said heated products of combustion will pass downward through the outer vertical or descending flues, into and through corresponding ones, P P, beneath the oven, to the front end of the stove, where they are discharged into a returning-flue, *q*, pass back to said vertical ascending flue, and through it to the exit-pipe M and chimney.

The flues at the back of the stove are situated between the back plate of the oven and the back of stove, and the flues at the bottom lie between the bottom of the oven and the bottom of the stove, and are separated from each other by suitable plates. The heat from these flues is radiated through the plates both into the oven and out into the room, and, in order to retain said heat within the stove, there are provided casings for the back and for the bottom of said stove, which are made of tin or other suitable material, and placed at a proper distance from the back and bottom of said stove. When thus incased, the heat that is radiated by the back and bottom of said stove strikes said casing and is reflected back again to aid in the baking of articles within the oven. Between said casings and the back and bottom of said stove is confined a stratum of air, S, which acts as a non-conductor and aids in retarding the escape of heat from said stove. By this arrangement much greater economy in the use of fuel is secured and the room in summer is much more comfortable for those who work in it than would be possible without said casings. The back casing, or extra back, *u*, is made to fit closely to the back of said stove around its edges, so that as little air shall get in or out as is possible, and is held in place at the top by a lug placed under the top of the stove, and at the bottom by a nail or pin placed in a hole provided for that purpose in the bottom of the stove; or it may be fastened in any other manner deemed best.

The bottom casing, *v*, is also made to fit closely to the bottom of the stove, and is provided with ears, into which fit staples cast in the bottom of said stove, so that when such bottom casing is brought to its place under the stove and the staples made to pass through the holes in the ears, a nail or pin passed through said staples will hold said casing in place. There may be any number of these ears that may be necessary to hold the casing closely to the bottom, or the casing may be secured to the bottom in any manner that may be thought best. It matters not how far said bottom casing is placed from the bottom of the stove provided the air is confined within the space between said stove and casing, or if the casing reflects the heat into the stove again.

The back and bottom casings may be permanently fastened to the stove or made removable, as desired, in either of which events the principle designed (preventing the loss of heat) would be attained. It is, however, desirable to have them removable, in order that more heat may be thrown into the room in winter.

In Figs. 1, 2, 3, and 7, at Y, is seen a valve or flue-stop. The opening for this flue-stop is partly in the hearth Z and partly in the front plate, *d*, of the stove, or it may be wholly in the front plate, *d*, in the portion below the doors K, and is closed by a corresponding cover of iron. It opens into the flues under the bottom of the oven, and may be used to clean from said flues ashes or soot that collects there, or it may be used to regulate the draft. To check the draft with this flue-stop it is drawn back, so as to admit a stream of air to the flues. To this stove is attached a reservoir, C, for heating water by means of the heated escaping products of combustion from the fire after they shall have done their work in the different parts of the stove. Said reservoir is made of any material thought best for the purpose, and is caused to rest nearly over the ascending and descending flues of the stove and over a chamber, D, of any suitable size, and is provided with two pipes passing from the chamber D to the smoke-pipe. This chamber D connects by an opening through the back of the stove with the rear vertical ascending flue, and receives the heated products of combustion therefrom on their way to the chamber. Said pipes commence at the bottom of said reservoir and pass through the inside and unite near the top, forming one pipe at that point. By this means the water in the reservoir has a very large heating-surface exposed. The reservoir and its operation are described at length in the specification of the second division of this application, of even date herewith.

Having thus described the nature, construction, and operation of this invention, what I claim, and desire to secure by Letters Patent of the United States of America, is—

1. The supplying of a continual current of atmospheric air, heated by the front plate of the fire box or chamber of combustion, or by the front and end plates thereof, and in a flue, chamber, or space immediately in front of the same, or in front and at the end of said fire-chamber, and in combination therewith, to the oven of a cooking-stove, in which the oven is in the rear of the fire-chamber, and at the same time extends under the same, so as to connect with the said flue, chamber, or space, and thus and thereby permit the said heated air to enter the said oven in the manner and for the purposes substantially as herein described and set forth.

2. The flue space or intervening chamber F immediately in the front of the fire-box or chamber of combustion, having a fire-grate and ash pit or chamber combined therewith, or in front and at the end of said fire-chamber, and the whole arranged and suspended in the front and upper corner or part of the oven I, into which space or intermediate chamber atmospheric air is admitted through apertures $x'$, or any equivalent therefor and thereof, and which are and shall be in and through the plate or door or doors in the front part of the cooking-stove, and in combination with the oven of such stove, so that the air heated within such intermediate chamber, substantially as herein set forth, may or shall be conducted to and into the oven, for the purposes and by the means substantially as herein described and set forth.

3. The admitting of air to said chamber F, and through it to said oven, constructed and arranged as described, by means of the apertures $x$ in the front plate or doors, or by means of the apertures $x''$ in the side plate of the stove, or by any equivalent for either or both of said apertures, substantially as and for the purposes herein described and set forth.

4. In a stove constructed with an oven and with a fire box or chamber of combustion, having a fire-grate therein, and an ash pit or chamber below, and all combined therewith, substantially like the one hereinabove described and set forth, the making of the front plate of the stove to open with a door or doors, K, and the attaching an apron in the front of the stove, so as to receive and contain a kitchen or other suitable roaster, substantially as specified herein, so that the heat radiated by the front plate of the fire-box or combustion-chamber shall be aided by the heat radiated by the oven-plates therein in the manner and for the purposes substantially as herein described and set forth.

5. The employment and arrangement of the front doors, K, provided with apertures $x$, or any equivalent thereof and therefor, therein, in combination with the fire box or chamber of combustion $a$, by means of which atmospheric air in a highly-heated condition is admitted to the oven of a cooking-stove for the purposes substantially as herein described and set forth.

6. The employment and arrangement in the front of a cooking-stove of a door or doors, K, or any equivalent thereof and therefor, so that the same, or a part thereof, shall open in front of the fire box or chamber of combustion, in combination with the fire-chamber or chamber of combustion having a fire-grate therein and ash-pit chamber combined therewith, and arranged and suspended in the front part of the oven of a cooking-stove in the manner and for the purposes substantially as herein described and set forth.

7. The employment and arrangement of a suitable door or doors in the front of a cooking-stove which shall in part or in whole open into that part or portion of the oven which extends forward and under the fire-box or chamber of combustion, and other parts necessarily employed and used therewith, in the manner and for the purposes substantially as herein described and set forth.

8. The arrangement of a fire-chamber or chamber of combustion with a fire-grate and an ash-pit or ash-chamber combined therewith, and the whole suspended in the front part and upper corner of oven of a cooking-stove in the manner and for the purpose substantially as herein described and set forth.

9. The employment and arrangement of the additional or extra bottom and incasement *v* in combination with the flues of the bottom of a cooking-stove and underneath the oven I in the manner and for the purposes substantially as herein described and set forth.

10. The employment and arrangement of the additional or extra back and incasement *u*, in combination with the ascending and descending flues in the rear end of a cooking-stove, and between the rear end of the oven and the rear vertical end plate of the stove, in the manner and for the purposes substantially as herein described and set forth.

11. The employment of a corrugated plate perforated along the front thereof for the top of the oven I, as arranged, in connection with the flue H and fire-chamber or chamber of combustion, and with the rear and vertical plate of the oven of a cooking-stove, substantially as and for the purposes herein described and set forth.

12. The employment and arrangement of the front damper or valve, Y, in the front and hearth of a cooking-stove, in combination with the flue or flues, as the case may be, immediately underneath the oven and bottom plate of the oven of a cooking-stove, having the fuel-chamber and ash-pit arranged, as hereinbefore specified, in the manner and for the purposes substantially as herein described and set forth.

13. The employment and arrangement of the boiler or reservoir having a removable or detached cover or top, and containing two inclined flues or tubes, which are separated at the bottom or lower ends thereof, and which unite at the top or upper ends thereof, and thus and then form but one pipe, in the manner and for the purposes substantially as herein described and set forth.

In testimony whereof I have on this 17th day of April, 1869, hereto affixed my name, in the presence of two witnesses, to wit:

ELIZA C. STEWART,
*Legatee and Executrix.*

Witnesses:
BENJ. H. HALL,
JAMES S. HALL.